T. T. SCOTT.
MACHINE FOR REPAIRING THE LININGS OF FURNACES.
APPLICATION FILED OCT 9, 1919.
1,390,930.
Patented Sept. 13, 1921.
2 SHEETS—SHEET 1.
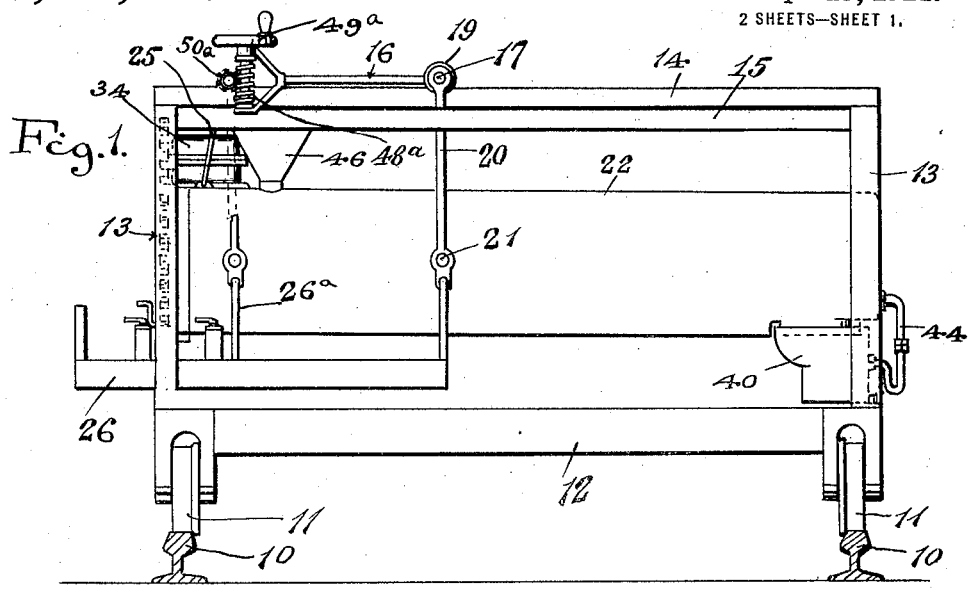
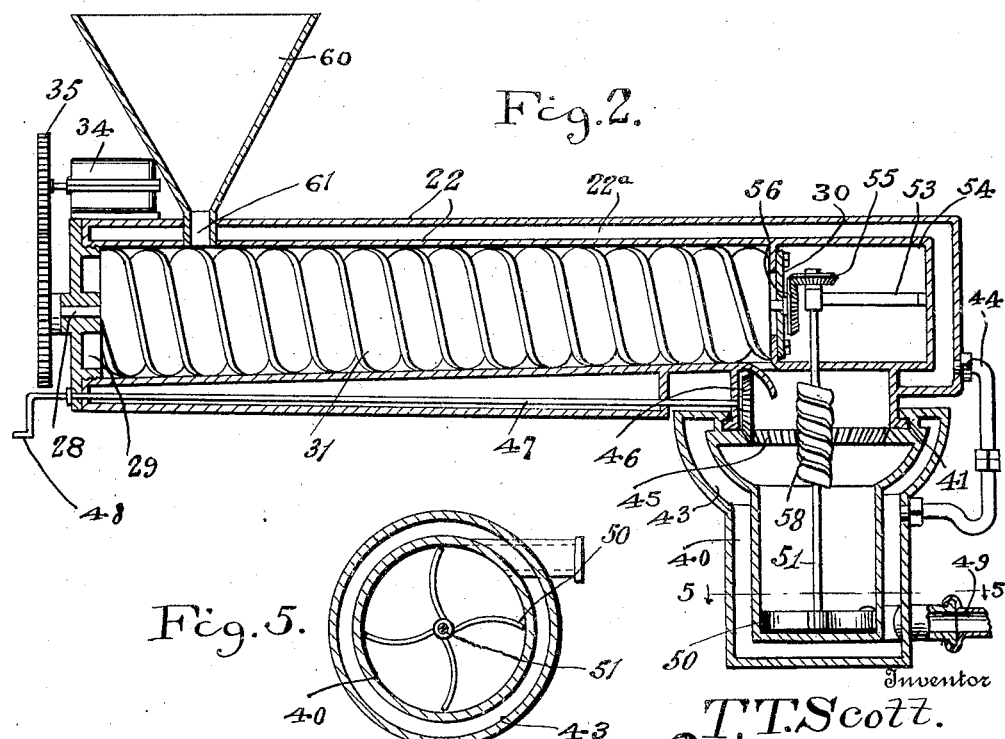

T. T. SCOTT.
MACHINE FOR REPAIRING THE LININGS OF FURNACES.
APPLICATION FILED OCT 9, 1919.
1,390,930.
Patented Sept. 13, 1921.
2 SHEETS—SHEET 2.
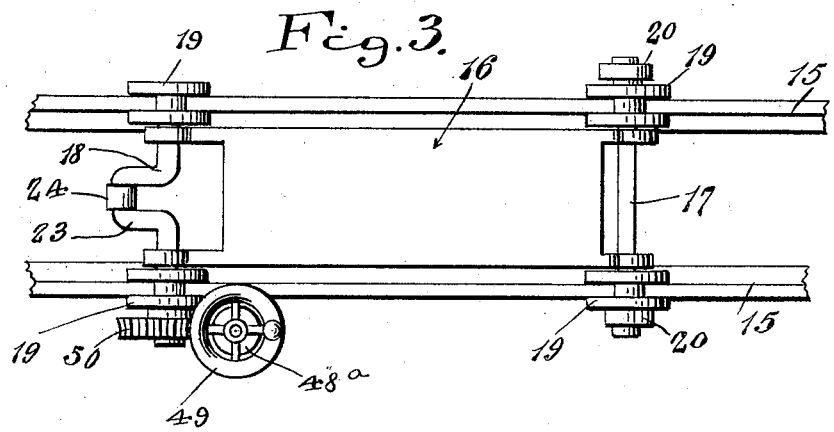
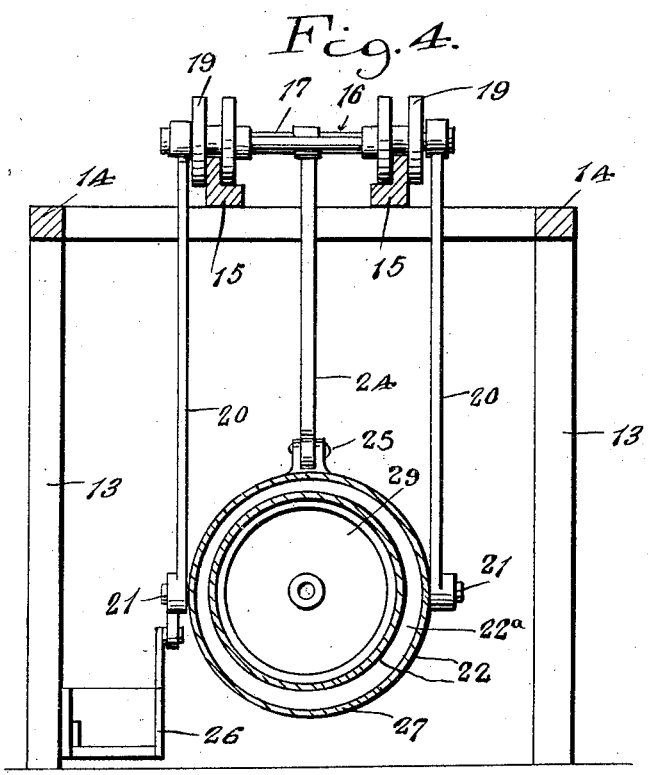

UNITED STATES PATENT OFFICE.

THOMAS T. SCOTT, OF YOUNGSTOWN, OHIO.

MACHINE FOR REPAIRING THE LININGS OF FURNACES.

1,390,930.  Specification of Letters Patent.  Patented Sept. 13, 1921.

Application filed October 9, 1919. Serial No. 329,586.

*To all whom it may concern:*

Be it known that I, THOMAS T. SCOTT, a citizen of the United States, residing at Youngstown, in the county of Mahoning and State of Ohio, have invented certain new and useful Improvements in Machines for Repairing the Linings of Furnaces; and I do hereby declare the following to be a full, clear, and exact description of the invention, such as will enable others skilled in the art to which it appertains to make and use the same.

This invention has for its object to provide an improved and portable machine for projecting dolomite, or other refractory material, in a comminuted state at a high velocity against the interior surface of the wall of an open hearth or other furnace.

Another object is the provision of a machine of this character embodying means whereby the refractory material may be uniformly distributed or coated over the entire surface of the wall of the furnace.

With these and other objects in view, the invention consists in the novel construction, combination and arrangement of parts as will be hereinafter specifically described, claimed and illustrated in the accompanying drawings, in which:

Figure 1 represents a side elevation of the machine,

Fig. 2 represents a detail sectional view through the coating mechanism,

Fig. 3 represents a fragmentary plan view of the carriage supporting the coating mechanism, Fig. 4 represents a transverse vertical sectional view through the machine, and Fig. 5 represents an enlarged sectional view through the rotatable head on the line 5—5 of Fig. 2.

Referring to the drawings in detail, wherein similar reference numerals designate corresponding parts throughout the several views, the numeral 10 indicates a suitably supported track upon which is adapted to travel the wheels 11 of a truck, carrying the horizontally disposed beams 12 upon which are mounted the vertical uprights 13, arranged in pairs at the opposite ends of the beams 12. Horizontal bars 14 are supported upon the upper ends of the uprights 13 and are connected by a pair of spaced parallel track rails 15.

A carriage, designated generally by the numeral 16, is adapted to travel upon the track rails 15 and is provided with front and rear axles 17 and 18, respectively, upon which are mounted flanged wheels 19 movable upon the track rails 15. A pair of supporting arms 20 are pivotally secured to the ends of the axle 17 outwardly of the wheels 19 and are pivotally connected at their lower terminals with laterally projecting trunnions 21 carried by the cylinder 22 of the projecting mechanism. The rear shaft 18 is provided with a crank 23, having connection with a rod 24, which latter is pivotally connected at its lower end to the cylinder 22 at a point rearwardly of the connection of the arms 20 with said cylinder, as indicated at 25.

A laterally projecting platform 26 is connected with the cylinder 22 at 26$^a$ and 21, and is designed to support the operator of the machine, when the latter is in use.

The cylinder 22 of the projecting mechanism is double walled, providing a water chamber 22$^a$.

A shaft 28 is journaled at one end in the rear end wall 29 of the cylinder 22, extends forwardly therethrough and is supported at its forward extremity in a bearing member supported in a partition 30. A conveying worm 31 is carried and operable by the shaft 28 and extends from the end 28 of the cylinder 22 to the partition 30. The shaft 28 and worm 31 are rotated, during operation of the machine, by a motor 34, supported upon the cylinder 22 and connected with the shaft by gear wheels 35.

A depending head 40 is rotatably supported upon a depending circular flange 41 carried by the forward end of the cylinder 22 and the interior of the head 40 communicates with the interior of the cylinder 22 by a passage 42. The head 40 is of double walled formation, providing a water chamber 43, which is connected by a flexible tube 44 with the chamber 22$^a$ and the cylinder 22, so as to insure a thorough circulation of water about the cylinder and head and yet permit the latter to rotate independently of the cylinder.

Internal gear teeth 45 are formed adjacent the upper open end of the head 40 and mesh with a bevel gear wheel 46 attached to a shaft 47, which latter is rotatably supported in the cylinder 22 and is provided at its rear extremity with a hand crank 48, whereby the shaft and bevel gear wheel 46 may be rotated to adjust the head 40 with relation to the cylinder 22.

The lower portion of the head 40 is formed with a discharge port 49, adjacent which is arranged a bladed wheel or agitator 50, carried by a vertically disposed shaft 51 rotatably supported at its lower terminal upon the bottom 52 of the head and supported adjacent its upper terminal in a bearing member 53 secured in the chamber 54 between the front end of the cylinder 22 and partition 30. A bevel gear wheel 55 is attached to the upper extremity of the shaft 51 and meshes with a similar gear wheel 56 carried by the shaft 28, whereby rotary movement is imparted from the shaft 28 to the shaft 51. A conveying worm 58 is fastened to the portion of the shaft 51 lying in the passage 42, so as to insure a constant feed of the dolomite from the cylinder 22 to the head 40.

Over the rear end of the cylinder 22 is arranged a filling spout 60, which communicates with a filling opening 61 formed in the cylinder, whereby dolomite or other refractory material is conducted to the interior of the cylinder.

In operation, the coating machine is transported from one furnace to another by a truck, which travels upon the track rails 10, and when the truck has been properly positioned with relation to the door of the furnace the coating mechanism and carriage 16 are moved forwardly so as to dispose the head 40 within the walls of the furnace. When properly positioned the head 40 is adjusted by the hand crank 48 so as to turn the discharge opening 49 in such position as to direct the refractory material against the walls of the furnace. The motor 34 is set in operation and the rotary movement of the screw 31 is transmitted to the shaft 51 through the bevel gear wheels 55 and 56, thus driving the conveying worm 58 and the bladed wheel 50, which latter operates to forcibly discharge the refractory material through the discharge port 49. While in operation, the head 40 may be turned by the hand crank 48, so as to coat the inner surfaces of the several walls of the furnace.

The forward extremity of the rotatable cylinder 22, together with the head 40, may be oscillated vertically to distribute the coating composition over the entire surface of the rear wall, from top to bottom, by adjusting the worm gear 48ª, which is provided with a hand wheel 49ª and meshes with a gear 50ª carried by the shaft 18, thereby rotating the latter together, with the crank 23, and transmitting a reciprocatory movement to the rod 24, which latter, as will be understood, is connected at 25 with the rear portion of the outer cylinder 22.

What I claim is:

1. A machine of the character described including a wheel mounted truck, means for projecting a coating material against the walls of a furnace, means supporting said projecting means from said truck and permitting horizontal projection of the projecting means, and means to adjust the projecting means vertically.

2. In a machine of the character described, a cylinder, a conveyer worm rotatably mounted in the cylinder, a shaft supporting said worm, a feed hopper arranged to discharge material upon the conveyer worm, a rotatable head communicating with the cylinder and having a discharge port therein, and means operable by said shaft to project material through the port.

3. A machine of the character described including a wheel mounted and portable truck, a track supported upon said truck, a carriage movable longitudinally of said track, and means carried by and movable with the carriage for projecting a coating material against the walls of a furnace.

4. A machine of the character described including a wheel mounted and portable truck, a track carried by said truck, a carriage movable longitudinally of said track, a cylinder pivotally supported by said carriage, means associated with said cylinder for projecting a coating material against the walls of the furnace, and means for adjustably supporting the cylinder.

5. A machine of the character described including a wheel mounted truck, rotatable means for projecting a coating material against the walls of a furnace, means supporting said projecting means from said truck and permitting horizontal projection of the projecting means, and means for tilting the projecting means vertically.

6. In a machine of the character described, a cylinder, a conveyer worm rotatably mounted in the cylinder, a supporting truck for said cylinder, means for tilting said cylinder at different inclines within the supporting means therefor, a head communicating with the cylinder and having a discharge port, and means for projecting a refractory material through said port.

7. In a machine of the character described, a cylinder, a portable truck for said cylinder, means for mounting said cylinder within said truck for longitudinal movement and pivotal movement thereon, a conveyer worm rotatably mounted in said cylinder, a shaft supporting said worm, a feed hopper arranged to discharge material upon the conveyer worm, a rotatable head beneath said cylinder and communicating with the latter, said head having a discharge port therein, and means operable by said shaft to project material through said port of the rotatable head.

8. A machine of the character described including a wheel mounted and portable truck, a track carried by said truck, a carriage movable on said track, a cylinder suspended from said carriage, means rotatably mounted on said cylinder for projecting a coating material against the walls of a furnace, and means for adjustably supporting the cylinder.

9. In a machine of the character described, a portable truck, a track mounted on said truck, a cylinder suspended on said truck, a carriage movable on said track, said cylinder being supported by said carriage, means for moving said carriage and cylinder on said track, means for tilting said cylinder, a platform movable with said cylinder, and projecting means supported by and communicating with said cylinder to project material upon the walls of a furnace.

10. In a machine of the character described, a portable truck, a track mounted on said truck, a cylinder suspended on said truck, carriage supporting means for said cylinder movable on said track, said cylinder being adapted to be tilted to various inclines, an adjustable projecting member suspended beneath said cylinder and communicating therewith, means rotatable within said cylinder to feed material from the latter to said projecting means, a feed hopper for said cylinder, and agitating means operable within said projecting means to agitate the material being projected from said projecting means.

In testimony whereof I affix my signature in presence of two witnesses.

THOMAS T. SCOTT.

Witnesses:
MYRON E. ULLMAN,
JASPER DOOLITTLE.